Patented Dec. 22, 1953

2,663,671

UNITED STATES PATENT OFFICE 2,663,671

METHOD OF BREAKING A UREA COMPLEX

Everett Raymond Wiles, George Lentton Meyers, and Harold Hedrick Coffman, Barnsdall, Okla., assignors, by mesne assignments, to Marathon Corporation, Rothschild, Wis., a corporation of Wisconsin No Drawing. Application August 17, 1949, Serial No. 110,888

6 Claims. (Cl. 196—17)

This invention relates to a process for treating or separating materials with urea and more particularly to an improved method for commercially refining petroleum waxes, oils, and oxygenated compounds.

Urea has been found to react with a number of materials, such as, oils, waxes, oxygenated compounds, etc. to form a solid material, which we shall refer to as the urea complex or reaction product. It has been suggested that urea combines with certain components in a hydrocarbon mixture having characteristics of the aliphatic normal hydrocarbons. These components in a hydrocarbon wax generally have a higher melting point and are more brittle than the branched chain or other hydrocarbons in that wax. This urea reaction thus offers a method of separating components in hydrocarbon and particularly petroleum waxes which have particular properties for special applications.

In carrying out the treatment of waxes with urea it has been the practice previously to mix molten or melted wax with urea and a urea solvent, usually water or methyl alcohol. Upon agitation and heating a solid reaction product is formed which can be separated as by filtration, washed, and disassociated or broken with water or heat into urea and the wax which reacts with urea. In this process the disassociation of the wax-urea complex presents a difficult problem in handling materials which greatly adds to the cost of refining by this method.

An object of this invention is to provide a process for treating materials having a component reactive with urea to form a urea complex wherein the handling of the urea complex is expedited. It is a further object to provide a simplified process wherein the urea is recycled for use in treating additional quantities of material. It is still a further object to provide a commercial process for treating petroleum waxes wherein the process is carried on in substantially continuous cycles and in which reusable materials are recovered and reused from cycle to cycle.

In general the aforesaid objects are accomplished in our process by the step of disassociating or breaking of the urea complex by heat, in the presence of a solvent having certain specific properties. The solvent must be selective, i. e., it must be a good solvent for the reactive material but must not dissolve a substantial amount of urea, it must be nonreactive with urea and it must have a boiling point under the imposed operating conditions that is higher than the temperature at which the urea complex breaks or disassociates. At this breaking temperature, in the case of a urea-wax complex, the urea complex disassociates into two distinct liquid layers, i. e., molten urea and melted reacted wax, and when the complex is broken in the presence of our solvent the wax layer is dissolved in the solvent. The breaking temperature will vary with the amount of water present which in turn depends on the amount used in the step of reacting urea with the material being treated, but in every case the breaking temperature can be readily determined.

In carrying out our process we prefer to add the solvent having the desired properties described above to the urea complex in the operation of washing the unreacted material from the complex and excess urea if present. The solvent retained by the complex is sufficient to effect the separation desired in the breaking step. We may, however, wash the complex with some other suitable solvent, dry the complex and then slurry it in our high boiling nonreactive selective solvent in order to carry out the breaking step of our process.

After the urea complex has been broken by heating to the breaking temperature or by boiling the solution, the liquid layers can be separated by decantation and the urea thus regenerated may be crystallized by cooling and returned for use in reacting with additional material to be treated. In other methods of breaking the complex, such as by water, the separated urea must be processed to a considerably greater degree before it is ready for recycling. The reactive material may be separated from the solvent by any conventional solvent recovery method and the solvent recovered may be returned for use in the process.

As a modification of our process we have found that after the complex has been broken, and the two liquid layers have formed, the mixture can then be cooled sufficiently to crystallize the liquid urea layer in the mixture and the hydrocarbon solution can be readily separated as by decantation or filtration. We have found that there is a difference between the temperature at which the urea will re-react with the liberated reactive material that formed a part of the original complex and the temperature at which the urea will crystallize. By cooling the mixture to any temperature within this range the urea crystallization may take place without the reaction re-occurring.

The following is a preferred example of our process wherein microcrystalline wax was treated with urea and both a non-reactive and a reactive portion of the wax was separated. Our process contemplates four charging materials to the process—the wax to be refined, urea, water, and a selective solvent having the desired properties described above. In separating the components in microcrystalline wax we prefer to use xylene, which is sold commercially as xylol as the selective solvent. To effect a substantially continuous process the microcrystalline wax was treated in five separate batches each treatment constituting a complete cycle of the process and in each cycle the urea and the solvent utilized was that obtained from the preceding cycle.

In carrying out the first cycle above 10 lbs. of microcrystalline wax manufactured by the Bareco Oil Company and having a melting point of 190–195° F. (A. S. T. M. D127–30 method) was dissolved in xylene in the ratio of two parts xylene to one part wax. The xylene solution was heated to about 200° F. to effect complete solution and the solution was then added to about 15 lbs. of urea and a small amount of water. The urea-wax ratio was about 1½ to 1 by weight and the water was in an amount equal to about 2.26% of the weight of the urea. The mixture of wax and urea in the presence of solvent and water was reacted in a reaction zone, i. e., an open vessel, with agitation, by mechanical stirring at a temperature of about 150° F. and the reaction was continued until the mixture set up into a semi-solid mass consisting of solid reaction products, i. e., urea-wax complex, wetted with a solution of nonreacted material and solvent. The mixture was then transferred to a mixing and pulping zone, i. e., a second open vessel, where additional hot solvent was added to completely dissolve the nonreacted material from a slurry of the solid reaction products which consists of the urea-reactive wax complex and any excess urea which may be present. The complex was then separated from the slurry in a separation zone, i. e., a filter press, by filtration. The solid mass was then washed in the separation zone with additional solvent until it was entirely free of nonreactive material. The solid mass wetted with or having occluded solvent as a result of the washing step was then conveyed to a breaking zone, i. e., a third open vessel, where it was heated to the breaking temperature which in this example was in the range of 250–270° F. At the breaking temperature the solid mass separated in the open vessel into a liquid urea layer on the bottom and a solution of wax in xylene on the top. After the breaking was effected the layers were separated by decanting off the wax-solution top layer from the liquid urea bottom layer. The liquid urea was passed through a crystallization zone where, upon cooling, the urea was crystallized and returned to the reaction zone. The wax solution and xylene were passed to a solvent recovery zone where the xylene was recovered from the reactive wax (R-Wax) by steam distillation. A portion of the xylene was then returned to the reaction zone.

The nonreacted wax solution from the separation zone was passed to a solvent recovery zone, i. e., a conventional still, where the xylene was recovered from the nonreactive wax (N-Wax) by steam distillation and the xylene returned to solvent storage for reuse in succeeding cycles.

After the recovery of urea and solvent a second cycle of our process was then begun by dissolving about 7½ lbs. of additional microcrystalline wax in enough xylene to provide a solvent-wax ratio of 2 to 1 and this solution was then introduced to the reaction zone with the urea obtained in the urea crystallization step, and water. All of the urea was recycled, and based on an assumed 100% recovery of urea, the urea-wax ratio in the second cycle was approximately 2 to 1. The second cycle was then conducted in substantially the same manner as the first cycle with some slight changes in temperature as shown in Table I below. Following the recovery of urea and xylene from the second cycle, a third cycle was then carried out as was a fourth and a fifth cycle. Altogether a total of 40 lbs. of wax was treated in five cycles using only 15 lbs. of urea.

The table give the operating data for each cycle as well as the physical properties of the reactive (R) and nonreactive (N) waxes obtained.

TABLE

Wax Charged: 190-195 Amber.
Solid Point, °F ............................................. 181
Melting Point, °F ........................................... 194.7
Penetration ................................................. 5.0

| Cycle No. | 1 | 2 | 3 | 4 | 5 |
|---|---|---|---|---|---|
| Wax charged, lbs | 10 | 7.5 | 7.5 | 7.5 | 7.5 |
| Urea/wax, weight ratio | 1.5:1 | 2:1 | 2:1 | 2:1 | 2:1 |
| Solvent/wax, weight ratio | 2:1 | 2:1 | 2.67:1 | 2:1 | 2:1 |
| Percent water based on weight of urea | 2.26 | 2.0 | 2.0 | 2.0 | 2.0 |
| Reaction temp., °F | 150 | 155 | 160 | 160 | 155 |
| Breaking temp., °F | 250–270 | 265–270 | 270 | 270 | 270 |
| R-wax, percent yield | 37.5 | 43.3 | 40.0 | 30.0 | 40.0 |
| Solid point, °F | 189 | 189 | 190 | 191 | 191 |
| Melting point, °F | 201.4 | 200.3 | 200.6 | 203.5 | 202.6 |
| Penetration | 1.0 | 1.0 | 1.0 | 1.0 | 1.0 |
| N-Wax, percent yield | 42.5 | 50.0 | 66.6 | 66.6 | 60.0 |
| Solid point, °F | 169 | 168 | 170 | 174 | 174 |
| Melting point, °F | 177.7 | 179.2 | 177.8 | 181.2 | 182.0 |
| Penetration | 11.5 | 11.5 | 10.0 | 8.0 | 8.0 |

In the table the urea/wax ratio for cycles 2, 3, 4 and 5 is based on the amount of urea charged to cycle 1. No determination was made of the loss of urea during the process, but it was assumed to be small. The melting points as shown in the table were determined by A. S. T. M. D21–30 method, the Penetration by A. T. S. M. D5–25 method.

It will be noted that the yields of reactive wax decreased only slightly with increasing number of cycles which indicates that the urea is not deactivated in our process. In fact the decrease can be accounted for by handling losses and by some decomposition of urea which necessarily take place when the complex is being broken. Obviously any number of cycles can be practiced by merely supplementing the urea in the process from time to time. Furthermore, by utilizing a urea and solvent storage to which the recycled material is returned, the process can be operated in such a manner that the second batch of material to be treated may be introduced into the reaction zone immediately after removal of the reacted mixture to the pulping zone, and thus two or more batches may be moved through the processes at the same time. In this way the equipment can be utilized to maximum advantage and still full advantage can be taken of the conservation of materials obtained by recycling urea and solvent.

As to the conditions under which we can practice our process, the urea/wax ratio may vary depending on the amount of reactive material present and the desired yield thereof. The 2:1 ratio on a weight basis used in our example is generally sufficient to obtain maximum yields of reactive material in most microcrystalline waxes. Higher ratios, for example about 4:1, may be used since any nonreacted urea will pass through the process without impairing the reaction. We have found that in treating paraffin wax about a 4:1 wax/urea ratio is preferred. With respect to the water or urea solvent used, it usually need only be enough to initiate the reaction. We have used on one hand moist urea and on the other hand water concentrations in the range of about 2.5% to about 20% of the weight of urea with good results, however, we prefer to operate in the range of about 1% to about 5% of the weight of urea. The solvent/wax ratio may be varied when solvent is used in the reaction step within a wide range. In general the presence of the solvent suppresses the temperature at which the reaction can be initiated but otherwise does not affect its progress. We prefer to use a solvent/wax weight ratio in the range of about 1:1 to about 2:1 particularly when using xylene as the solvent.

The reaction temperature is a function of the reactants used and the quantity of each. For example, if no wax solvent is used in the reaction step the reaction of microcrystalline wax and urea proceeds readily in the range of about 195° F. to about 220° F. and may be as high as about 240° F. When treating paraffin wax, the reaction proceeds at any temperature above the melting point of the wax, but generally in the range of about 180° to about 185° F. When solvent is used in the reaction step, for example xylene, in a solvent/wax ratio of about 1:1 by weight, we have found the preferred reaction temperature for treating microcrystalline wax to be in the range of about 150° F. to about 160° F., and for treating paraffin wax the preferred range is about 130° F. to about 140° F., though the reaction has been initiated at temperatures up to about 170° F.

As a modification of the above process the reaction may be carried out in the absence of solvent, preferably by heating the wax until molten, then adding the molten wax to the urea in the reaction zone. The water may be introduced directly into the reaction zone. In this modification the solvent is then preferably added to the reaction zone after the reaction is completed in order to facilitate the separation of the urea complex from the nonreactive material. If desired the reaction mixture could be filtered while hot enough to maintain the nonreacted material in liquid form and the solid mass obtained by filtration could then be washed with any suitable solvent for nonreacted material. If this is done, however, it would then be necessary to slurry the washed solid complex with xylene or one of the other high boiling solvents having the desired properties as indicated above before the breaking of the complex.

In a further modification of our process, the urea may be crystallized by cooling before separating the mixture of urea and reactive wax in solution obtained in the breaking step. The wax solution may then be withdrawn from the crystalline urea mass thus obtained and the crystalline mass returned directly to the reaction zone. We have found that the urea will crystallize at a temperature below the breaking temperature but above the temperature at which the urea will again react with the reactive wax. By adjusting the amount of water used in the reaction and the amount of solvent used in the breaking step this temperature range can be varied within practical limits.

Where the amount of high boiling solvent used in the breaking step is the amount retained by the complex after washing and the percent of water used in the reaction step is not more than 5% based on the weight of the urea, the breaking temperature of the complex will be at least about 250° F., while the temperature at which the urea will crystallize will be slightly lower, but in general above at least 240° F. and below the breaking temperature. The maximum reaction temperature at which the urea would again react with the reactive material under these conditions is generally below about 230° F. These temperatures, however, will vary and are only applicable to our preferred process. It is unnecessary in this modification to wash the urea crystals, though in some cases this may be desirable, since occluded solution of reactive material would not be detrimental to the process except to the very minor degree that the urea/wax ratio in any subsequent cycle may be effected by its presence.

Obviously, our process may be practiced on various charging stocks so long as they contain components which are reactive with urea. Examples of other charging stocks than microcrystalline wax are oxidized waxes, commercial paraffin wax, crude scale wax, and mixtures of oil and wax.

With respect to other solvents which may be used, liquid hydrocarbons, such as aromatic or naphthenic high boiling liquids or high boiling iso-paraffin liquids, are selective solvents for reactive components which in general meet the requirements of our process, i. e. they are good solvents for the reactive components of the complex and will not dissolve nor react with urea, provided they are selected to have a boiling point above the breaking temperature of the urea complex under the conditions of the process. The maximum breaking temperature will never exceed the fusion point of pure urea which at normal pressure is about 271° F., hence any of the above solvents boiling above about 271° F. are satisfactory. Mesitylene and propyl cyclohexane are examples.

Obviously, if the breaking temperature is lowered by the presence of water or urea solvent as indicated above, the solvent meeting the requirements of our process may have a boiling point below 270° F. This would also be the case if the breaking step were carried out under sufficient pressure to permit the use of lower boiling solvents. The criterion is that the solvent be liquid when the complex breaks so as to serve as a selective solvent for the reactive material to facilitate the separation from the urea.

It is appreciated that many other modifications will be apparent to those skilled in the art and no limitations in the scope of our invention are intended by the above examples except such limitations as are contained in the following claims:

We claim:

1. In the process of breaking a complex of urea and solid hydrocarbons, said complex containing about 1 to about 5% water, the steps which comprise heating said complex in the presence of a solvent consisting essentially of a liquid hydrocarbon which is a non-solvent for urea and non-reactive with urea until both urea and a solvent solution of the solid hydrocarbons, separate, cooling with agitation until the urea crystallizes in a granular form but above the temperature at which the urea will combine with regenerated hydrocarbon in said solvent, and removing the urea in a form suitable for reaction with further hydrocarbon.

2. A process of breaking a complex of urea and solid hydrocarbons as defined in claim 1 wherein the liquid hydrocarbon is xylene.

3. In the process of breaking a complex of urea and solid hydrocarbons, said complex containing from about 1 to about 5% of water, the steps of heating said complex in the presence of a solvent consisting essentially of a liquid hydrocarbon until layers of molten urea and solution of said solid hydrocarbon separate, cooling said layers until urea crystallizes without re-reacting with said solid hydrocarbons, removing said crystalline urea from the hydrocarbon solution and washing the urea with the liquid hydrocarbon until substantially free from reactive solid hydrocarbons.

4. In the process of breaking a urea-wax complex containing from about 1% to about 5% water, the steps of heating said complex in the presence of a solvent consisting essentially of a liquid hydrocarbon, said solvent having high solvency for wax and substantially no solvency for urea, to a temperature in the range of about 250° F. to about 271° F. to form molten urea and wax solution phases, and cooling with agitation until a temperature of from about 230° to about 250° F. is reached to crystallize granular urea in a form suitable for reaction with further wax.

5. In the process of breaking a urea-wax complex containing from about 1% to about 5% water, the steps of heating the complex in the presence of a solvent consisting essentially of a liquid hydrocarbon to a temperature in the range of about 250° F. to about 271° F. to form separate layers of molten urea and wax solution, withdrawing the molten urea layer, and cooling said urea in the presence of said hydrocarbon solvent with agitation to recrystallize granular urea capable of reacting with further wax.

6. In the process of breaking a urea-wax complex containing not in excess of 5% water, the steps of heating said complex in the presence of a solvent consisting essentially of a liquid hydrocarbon having a boiling range above about 270° F. to a temperature of about 250° to 270° F. to separate molten urea and a solution of wax in said solvent, commingling said urea and solution of said wax while cooling to a temperature of from 230° to 250° F. to crystallize granular urea, and removing said granular urea from the wax solution while still at a temperature of 230° to 250° F.

EVERETT RAYMOND WILES.
GEORGE LENTTON MEYERS.
HAROLD HEDRICK COFFMAN.

References Cited in the file of this patent

UNITED STATES PATENTS

| Number | Name | Date |
|---|---|---|
| 2,376,003 | Riethof | May 15, 1945 |
| 2,499,820 | Fetterly | Mar. 7, 1950 |
| 2,546,328 | Arabian et al. | Mar. 27, 1951 |
| 2,557,257 | Melrose | June 19, 1951 |

OTHER REFERENCES

Technical Oil Mission, Reel 143, translating by Shell Development Co. of German Patent application B 190,197 to Bengen, deposited in Library of Congress May 22, 1946 (pages 2-6 only, 5 pages).

Warth "The Chemistry and Technology of Waxes," pages 483 and 485. Pub. 1947 by Reinhold Publishing Corporation, New York, New York.